(12) United States Patent
Lyle et al.

(10) Patent No.: US 9,828,049 B2
(45) Date of Patent: Nov. 28, 2017

(54) WORKING MACHINE

(71) Applicant: J. C. Bamford Excavators Limited, Uttoxeter, Staffordshire (GB)

(72) Inventors: Jonathan Lyle, Uttoxeter (GB); John Griffin, Uttoxeter (GB); Peter Jowett, Uttoxeter (GB)

(73) Assignee: J.C. Bamford Excavators Limited, Uttoxeter, Staffordshire (GB)

( * ) Notice: Subject to any disclaimer, the term of this patent is extended or adjusted under 35 U.S.C. 154(b) by 0 days.

(21) Appl. No.: 14/927,266

(22) Filed: Oct. 29, 2015

(65) Prior Publication Data

US 2016/0121947 A1   May 5, 2016

(30) Foreign Application Priority Data

Oct. 29, 2014 (GB) .................................... 1419272.8

(51) Int. Cl.
*B62D 63/02* (2006.01)
*E02F 9/08* (2006.01)
(Continued)

(52) U.S. Cl.
CPC .............. *B62D 63/02* (2013.01); *B60K 17/10* (2013.01); *B62D 65/02* (2013.01); *B66C 23/36* (2013.01);
(Continued)

(58) Field of Classification Search
CPC .................. B62D 63/025; B62D 65/02; B62D 49/00–49/085; B62D 55/00–55/075; B60K 17/10; E02F 3/651; E02F 9/08
See application file for complete search history.

(56) References Cited

U.S. PATENT DOCUMENTS 4,326,571 A * 4/1982 Crawford ................ E02F 9/028
144/34.5
6,990,757 B2 * 1/2006 Takemura ............. E02F 9/0883
180/89.1
(Continued)

FOREIGN PATENT DOCUMENTS

CN         201169791 Y    12/2008
EP         2 639 362 A1    9/2013
(Continued)

OTHER PUBLICATIONS

Extended European Search Report for EP 15 19 2191, dated Apr. 1, 2016.
Search Report for GB 1419272.8, dated Mar. 27, 2015.

*Primary Examiner* — Erez Gurari
(74) *Attorney, Agent, or Firm* — Marshall, Gerstein & Borun LLP

(57) ABSTRACT

A base assembly for a working machine. The base assembly comprising a ground engaging structure, an undercarriage connected to the ground engaging structure, and a connector for connecting the undercarriage to a superstructure that mounts a working arm. A drive arrangement is provided for moving the ground engaging structure to propel, in use, the base assembly and a connected superstructure. The drive arrangement includes a prime mover and a transmission and the drive arrangement is housed within the undercarriage. An electronic control unit (ECU) is provided for controlling the drive arrangement and/or the ground engaging structure.

19 Claims, 10 Drawing Sheets

(51) Int. Cl.
    *E02F 9/20*     (2006.01)
    *B60K 17/10*     (2006.01)
    *B62D 65/02*     (2006.01)
    *B66C 23/36*     (2006.01)
    *B66F 9/075*     (2006.01)
    *E02F 3/32*     (2006.01)
    *E02F 9/00*     (2006.01)
    *E02F 9/12*     (2006.01)
    *E02F 9/22*     (2006.01)

(52) U.S. Cl.
    CPC .......... *B66F 9/07572* (2013.01); *E02F 3/325* (2013.01); *E02F 9/006* (2013.01); *E02F 9/08* (2013.01); *E02F 9/085* (2013.01); *E02F 9/0858* (2013.01); *E02F 9/121* (2013.01); *E02F 9/2058* (2013.01); *E02F 9/2062* (2013.01); *E02F 9/2275* (2013.01)

(56) References Cited

U.S. PATENT DOCUMENTS

| | | |
|---|---|---|
| 2002/0139597 A1 | 10/2002 | Kinoshita et al. |
| 2002/0154984 A1 | 10/2002 | Schaeff |
| 2003/0226293 A1 | 12/2003 | Takemura et al. |
| 2007/0119163 A1* | 5/2007 | Tatsuno .......... B60W 30/18072 60/493 |
| 2007/0240928 A1 | 10/2007 | Coltson et al. |
| 2014/0034403 A1 | 2/2014 | Tokuda |
| 2014/0360811 A1* | 12/2014 | Ross, Jr. ............... B66F 11/044 182/63.1 |

FOREIGN PATENT DOCUMENTS

| | | |
|---|---|---|
| GB | 2 257 414 A | 1/1993 |
| JP | 60-59239 | 4/1985 |
| WO | WO-2013/027873 A1 | 2/2013 |
| WO | WO-2013/102073 A1 | 7/2013 |
| WO | WO-2014/039041 A1 | 3/2014 |
| WO | WO-2014/168469 A2 | 10/2014 |

\* cited by examiner

WORKING MACHINE

FIELD OF THE INVENTION

The present invention relates to a base assembly for a working machine, a working machine and/or a method of manufacturing two different working machines.

BACKGROUND OF THE INVENTION

Various types of working machines are known. Such machines are used typically for soil-shifting operations (e.g. trenching, grading, and loading) and materials handling (e.g. depositing aggregate in trenches, lifting materials and placing them on an elevated platform).

Such machines are typically manufactured from a set of subassemblies designed specifically for one type of machine, although certain components such as engines, gearboxes, hydraulic pumps and undercarriages may be shared across different machine types.

Examples of known machines include the following:

Slew excavators comprise a superstructure rotatable in an unlimited fashion relative to an undercarriage. The superstructure includes a working arm arrangement for manipulating an attachment, such as a bucket, to perform working operations of the type listed above, a prime mover, such as a diesel IC engine, a hydraulic pump, and an operator cab. The prime mover drives the hydraulic pump, in order to provide pressurized fluid to operate the working arm arrangement, and also to power one or more hydraulic motors located in the undercarriage that are used to selectively drive either two endless tracks or four wheels (or eight wheels in a dual wheel configuration) for propelling the excavator.

A slew ring rotatably connects the superstructure and undercarriage, and a central rotary joint arrangement enables hydraulic fluid to pass from the pump in the superstructure to the hydraulic motor, and return to the superstructure, irrespective of the relative positions of the superstructure and undercarriage. If the slew excavator uses tracks for propulsion, steering is effected by differentially driving the tracks on opposing sides of the undercarriage. If the slew excavator uses wheels for propulsion, a steering arrangement is used for either two or four wheels, and separate hydraulic control is required for this in the undercarriage.

Slew excavators are available in a wide range of sizes. Micro, mini and midi excavators span a weight range from around 750 kg up to around 12,000 kg and are notable for typically having a working arm arrangement that is capable of pivoting about a substantially vertical axis relative to the superstructure by using a "kingpost" interface to the superstructure. Generally, mini and midi excavators have a weight of above around 1,200 kg. Large excavators, whose weight exceeds around 12,000 kg are often referred to as 'A frame' excavators and typically have a working arm arrangement that is fixed about a vertical axis, and can therefore only slew together with the superstructure. This is a function of the fact that the smaller excavators are expected to operate in more confined spaces and the ability to slew about two mutually offset axes in order to, for example, trench close to an obstacle such as a wall is therefore more desirable for micro, mini and midi excavators.

The working arm arrangement generally includes a boom pivotally connected to a dipper. There are several types of booms available including: a triple articulated boom which has two pivotally connected sections; and a mono boom that is often made from a single generally curved structure. A dipper is pivotally connected to the boom and a mount for an attachment, e.g. a bucket, is provided on the dipper. Hydraulic cylinders are provided to move the boom, dipper and mount relative to each other so as to perform a desired working operation.

Tracked excavators are not able to travel under their own propulsion for significant distances due to a low maximum speed and the damage their metal tracks cause to paved roads. However their tracks enhance the stability of the excavator. Wheeled excavators are capable of "roading" at higher speeds (typically up to 40 kph), and without appreciably damaging paved road surfaces. However, the working arm assembly inevitably extends forward of the superstructure during roading, which can impair ride quality, and forward visibility. When performing working operations the pneumatic tires do not provide a stable platform, so additional stabilizer legs are required to be deployed for stability.

Since the prime mover, hydraulic pump, hydraulic reservoir etc. are located in the superstructure, the center of gravity of all types of slew excavator is relatively high. Whilst these components can be positioned to act as a counterbalance to forces induced during working operations, packaging constraints may force such positioning to be sub-optimal, and may also restrict sight-lines over the rear of the machine, for example.

Excavators are generally used for operations such as digging. However, if it is desired to perform an operation such as loading, an alternative type of machine must be used. Machines capable of loading operations are known and have various formats. In one format, commonly referred to as a "telescopic handler" or "telehandler", the superstructure and undercarriage are fixed relative to each other and a central working arm in the form of a two or more part telescopic boom extends fore-aft of the machine. The boom pivots about a horizontal axis towards the aft end of the machine, an attachment is releasably mounted to a fore end of the boom, and is pivotable about a second distinct horizontal axis. Commonly used attachments include pallet forks and shovels. Telehandlers may be used for general loading operations (e.g. transferring aggregate from a storage pile to a required location on a construction site) and lifting operations, such as lifting building materials on to an elevated platform.

Telehandlers typically have four wheels on two axles for propulsion, with one or both axles being steerable and driven. A prime mover (typically a diesel IC engine) may be located in a pod offset to one side of the machine between front and rear wheels and is connected to the wheels by a hydrostatic or mechanical transmission. An operator cab is often located on the other side of the boom to the prime mover, and is relatively low between the wheels. Depending upon its intended application, the machine may be provided with deployable stabilizer legs.

A subset of telehandlers mount the cab and boom on a rotatable superstructure in order to combine lifting with slewing operations, at the expense of additional weight and greater height. As these machines are used principally for lifting, instead of loading, they have a longer wheelbase than conventional telehandlers to accommodate a longer boom, impacting maneuverability. Further, as sight-lines towards the ground close to the machine are less critical for lifting than for excavating, these are consequently quite poor.

For some lifting operations, particularly those of heavy load, it is more appropriate to use a crane than a telehandler. Mobile cranes are generally provided on a wheeled or tracked base. A boom, often a telescopic boom, is pivotally mounted to the base. Hoists, wire ropes or chains and sheaves are connected to the boom and used for moving materials from one location to another. The safety regulations for cranes are often stricter than the safety regulations for telehandlers.

In alternative working operations a worker may need to access an elevated work area, in such cases a mobile elevated work platform (MEWP) may be used. A MEWP generally has a wheeled base with a working arm connected thereto. The working arm carries a platform for a worker. The working arm may be for example, a scissor lift or an extensible or articulating boom. Since use of an MEWP involves working at an elevated level, there are again different technical and safety requirements imposed on an MEWP compared to those of the previously described working machines.

A yet further alternative working machine is a dump truck (also known as a dumper truck). A dump truck is often used for transporting material from one location to another (e.g. a multiplicity of loads from an excavator bucket). A dump truck has a dump body or a box bed that is pivotable to permit contents of the dump body to be unloaded. A tipping mechanism that is generally actuated by one or more hydraulic cylinders, and in some cases a cylinders and lever arrangement, is used to tip the dump body.

The cost to develop different machines such as those above for different working applications is significant. Further, the cost and delay to switch a production line from one type of machine to another is also significant.

It is further desirable that working machines become more efficient in operation, in terms of the amount of working operations undertaken for a given amount of fuel used. This may be a function of the fuel efficiency of the prime mover, transmission, driveline and hydraulic system, as well as being due to secondary factors such as poor visibility meaning that an operator needs to reposition the working machine unnecessarily frequently so as to view the working operation, or carrying out an operation much more slowly, thereby compromising efficiency.

SUMMARY OF THE INVENTION

A first aspect of the invention provides a base assembly for a working machine, the base assembly comprising: a ground engaging structure; an undercarriage connected to the ground engaging structure; a connector for connecting the undercarriage to a superstructure that mounts a working arm; a drive arrangement for moving the ground engaging structure to propel, in use, the base assembly and a connected superstructure, wherein the drive arrangement includes a prime mover and a transmission and the drive arrangement is housed within the undercarriage; and an electronic control unit (ECU) for controlling the drive arrangement and/or the ground engaging structure.

Provision of an ECU in the base assembly advantageously means that the base assembly is a self-contained operating unit. This means that a single base assembly can be used for a variety of different working machines, which eases production and reduces the cost of production of multiple types of working machines, because the equipment/assembly change over required is significantly reduced.

Further positioning the prime mover in the undercarriage improves access for servicing. In exemplary embodiments the superstructure may mount a cab, and in such exemplary embodiments noise, vibration and harshness (NVH) isolation is improved for an operator.

A yet further advantage of positioning the drive arrangement in the undercarriage is improved visibility for a user.

In one embodiment, the ECU is housed within the undercarriage.

In one embodiment, the ECU is configured to, in use, control superstructure functions of a superstructure connected to the base assembly.

In one embodiment, the ECU controls hydraulic functionality of a superstructure connected to the base assembly.

In one embodiment, the ECU controls operation of the working arm, e.g. lifting/lowering, extension/retraction, and/or articulation of the working arm.

In one embodiment, the ECU controls the electronic functionality of the superstructure.

In one embodiment, the ECU is configured to receive signals from inputs of the superstructure to control the superstructure functionality.

In one embodiment, the ECU is configured to receive signals from inputs of the superstructure to control the drive arrangement and/or ground engaging structure.

In one embodiment, the ECU is configured to receive signals from an auxiliary ECU associated with a superstructure that is connected, in use, to the base assembly.

In one embodiment, the signals received by the ECU are CAN bus messages.

In one embodiment, the ECU transmits CAN bus messages to control the drive arrangement and/or the ground engaging structure.

In one embodiment, the drive arrangement is a hydrostatic drive arrangement.

In one embodiment, the base assembly further comprises a chassis control valve for controlling fluid flow to a hydrostatic motor of the drive arrangement, and wherein the ECU is configured to control the chassis control valve.

In one embodiment, the working arm is hydraulically operated and the chassis control valve is further configured to control fluid flow to the working arm.

In one embodiment, the base assembly further comprises a dozer blade arrangement and/or a stabilizer arrangement connected to the undercarriage.

In one embodiment, the dozer blade arrangement and/or stabilizer arrangement is connected to the undercarriage using a releasable interlocking mechanism.

The base assembly may comprise hydraulic steering cylinders operable to change between two wheel steer, four wheel steer and/or crab steer. The base assembly may comprise a steer mode control valve configured to control fluid supply to the hydraulic steering cylinders. The ECU may be configured to control the steer mode control valve.

The base assembly may comprise a park brake actuated via a solenoid valve, and wherein the ECU may be configured to control the solenoid valve.

The base assembly may comprise an axle or differential lock actuated via a solenoid valve, and the ECU may be configured to control the solenoid valve.

In one embodiment, the connector is mounted substantially centrally to the undercarriage in a forward-rearward direction and in a lateral direction.

Positioning of the connector centrally to the undercarriage can further improve versatility of the base assembly because the connector permits features mounted to the superstructure, e.g. a cab to be positioned either centrally to the undercarriage or offset from the center by a certain degree dependent upon the machine functionality.

In one embodiment, the connector is a slew ring to permit rotation of the superstructure relative to the undercarriage.

In one embodiment, the slew ring between the superstructure and the undercarriage includes a rotary joint arrangement configured to permit electrical signals and/or hydraulic fluid to be routed to the superstructure independently of the position of the superstructure relative to the undercarriage.

In one embodiment, a majority of the prime mover is positioned below a level coincident with a level of connection of the connector with a superstructure.

In one embodiment, the ground engaging structure comprises a front axle and a rear axle and two wheels mounted to each of the front and rear axle.

In one embodiment, the front and rear axles are configured for at least two wheel steer.

In one embodiment, the front and rear axles are configured for four wheel steer.

In one embodiment, a majority of the prime mover is positioned below a level coincident with a level coincident with an upper extent of the wheels.

In one embodiment, the prime mover is positioned between the front and rear axles.

Advantageously, this improves packing of the base assembly.

In one embodiment, the prime mover is mounted in a transverse direction to a fore-aft direction of the working machine.

In one embodiment, the prime mover is mounted substantially perpendicular to the fore-aft direction of the working machine.

In one embodiment, the prime mover is a reciprocating engine including pistons and the engine is mounted such that the pistons have an upright orientation.

In one embodiment, a heat exchanger and cooling fan are mounted adjacent the prime mover and arranged such that an axis of rotation of the fan is substantially parallel to a fore-aft direction of the working machine.

Advantageously, this improves the packaging and cooling of the base assembly of the working machine.

In one embodiment, the working machine comprises a fuel tank positioned on one side of an axis extending in the fore-aft direction of the working machine and the prime mover is positioned on the other side of an axis extending in the fore-aft direction of the working machine.

In one embodiment, the working machine comprises a hydraulic fluid tank positioned on one side of an axis extending in a fore-aft direction of the working machine and the engine is positioned on the other side of the axis extending in the fore-aft direction of the working machine.

In one embodiment, the undercarriage comprises a main chassis and at least one subsidiary chassis secured thereto.

Producing a main chassis which can be substantially the same across a variety of working machines may advantageously further reduce the number of parts and allows a single production line to produce multiple machines, thereby saving cost and time.

In one embodiment, the ECU is housed within the main chassis.

A second aspect of the invention provides a working machine comprising: a base assembly according to the first aspect; a superstructure connected to the base assembly; and
 a working arm mounted to the superstructure.

In one embodiment, the superstructure mounts a cab that houses controls for manipulating the working machine.

In one embodiment, the working machine may comprise an ECU associated with the superstructure and configured to transmit control signals to the ECU of the base assembly.

In one embodiment, the working arm is hydraulically actuated and a main control valve is provided in the superstructure for controlling fluid flow to the working arm.

In one embodiment, the working arm is an excavator arm, a telescopic boom, or a jib.

Advantageously, the working arm may comprise an attachment (e.g. bucket or forks) or platform at one end thereof.

A further aspect of the invention provides a method of manufacturing two different machines, the method comprising: providing substantially identical base assemblies according to the first aspect; connecting one superstructure with one type of working arm to one of the base assemblies and connecting a different superstructure with a different type of working arm to the other of the base assemblies.

In one embodiment, the method may comprise programming the ECU to operate the base assembly and/or superstructure and/or working arm in a manner suitable for the type of superstructure connected to the base assembly.

In one embodiment, the method may comprise providing an auxiliary ECU in the superstructure configured to communicate with the ECU of the base assembly to control operation of the base assembly in a manner suitable for the type of superstructure connected to the base assembly.

In one embodiment, the method may comprise adding suitable stabilizer legs and/or a dozer blade arrangement to the base assembly.

The superstructure may comprise input controls (e.g. positioned in a cab or on a platform) that transmit control signals to the ECU.

The superstructure may comprise a main control valve for controlling fluid supply to the working arm, an attachment connected to the working arm and the superstructure. The main control valve may be controlled directly via the ECU in the superstructure or via the ECU in the undercarriage.

In one embodiment, the working arm is one of an excavator arm, a telescopic arm, a crane arm, a jib, an extensible mast, and/or a scissor lift.

BRIEF DESCRIPTION OF THE DRAWINGS

Embodiments of the invention will now be described, by way of example only, with reference to the accompanying drawings, in which.

DETAILED DESCRIPTION

General Format

Figure 1:
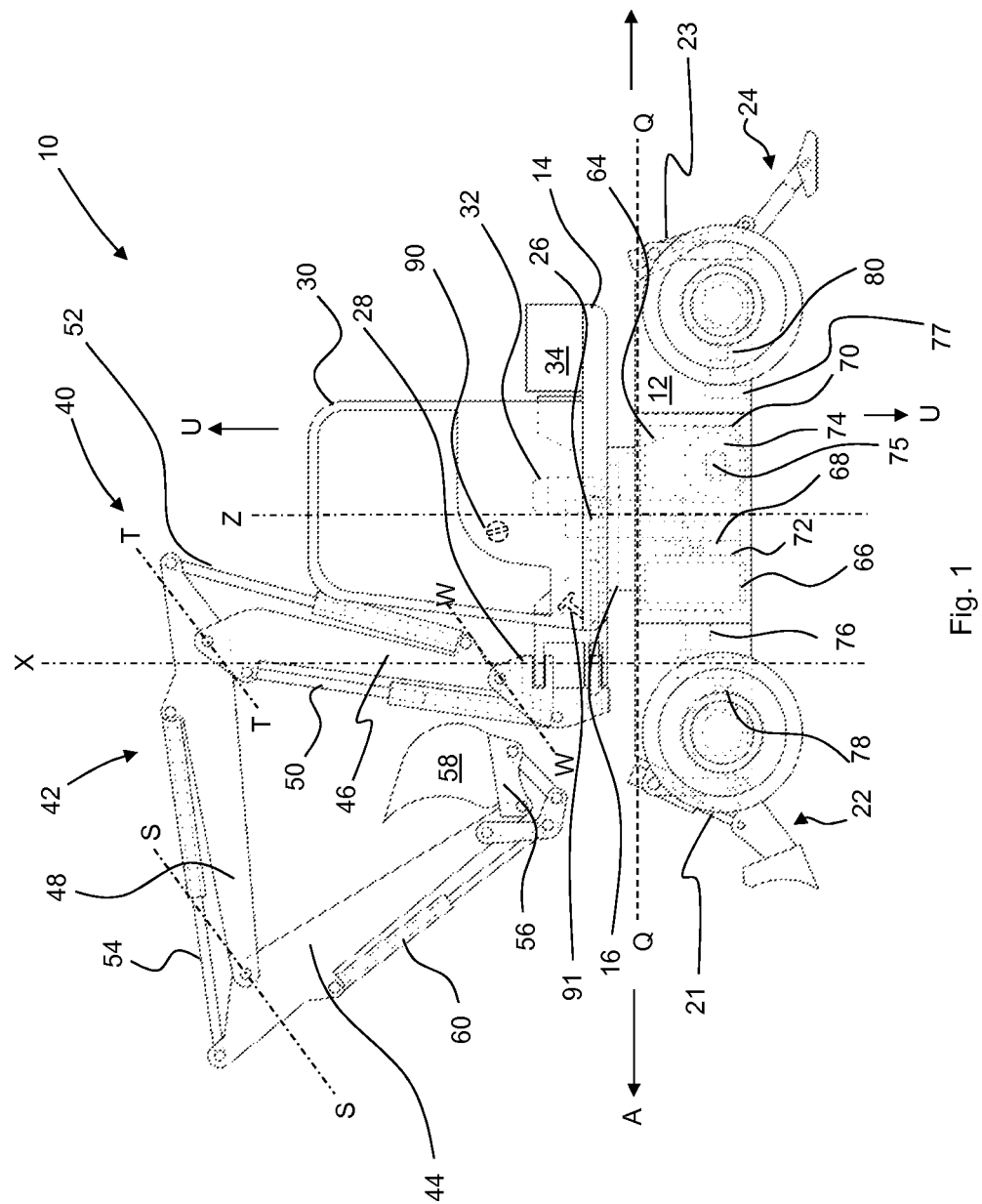
FIG. 1 is a side view of a working machine according to an embodiment of the present invention.

With reference to FIGS. 1 to 4, there is illustrated in somewhat simplified form a working machine 10 according to an embodiment of the present invention. In the present embodiment, the working machine may be considered to be a midi excavator (operating weight between approx. 6 and 12 metric tons). In other embodiments the working machine may be a mini excavator (operating weight between 1.2 and 6 metric tons). The machine comprises a base assembly 11 that includes an undercarriage 12. A superstructure 14 is linked to the undercarriage of the base assembly by a slewing mechanism in the form of a slewing ring 16. The slewing ring 16 permits unrestricted rotation of the superstructure relative to the undercarriage 12 in this embodiment. A cab 30 from which an operator can operate the working machine is mounted to the superstructure. A working arm arrangement 40 is rotatably mounted to the superstructure and provided for performing excavating operations.

Undercarriage

The undercarriage is formed from a pair of spaced chassis rails 18a and 18b extending fore-aft, and typically but not always being parallel, or substantially so. The rails provide a majority of the strength of the undercarriage 12. The undercarriage is connected to a ground engaging structure, which in this embodiment includes first and second drive axles 20a and 20b mounted to the chassis rails 18a, 18b and wheels rotatably attached to each axle end. In this embodiment the second drive axle 20b is fixed with respect to the chassis rails 18a, 18b, whereas the first drive axle 20a is capable of limited articulation, thereby permitting the wheels to remain in ground contact, even if the ground is uneven. The wheels 19a, 19b, 19c, 19d are typically provided with off-road pneumatic tires. The wheels 19a, 19b, 19c, 19d connected to both axles are steerable via steering a hub 17a, 17b, 17c, 17d. In this embodiment, the wheelbase is 2.65 m, and a typical range is 2.0 m to 3.5 m.

For the purposes of the present application, the fore-aft direction A is defined as a direction substantially parallel to the general direction of the chassis rails 18a and 18b. A generally upright direction U is defined as a direction substantially vertical when the working machine is on level ground. A generally lateral direction L is defined as a direction that is substantially horizontal when the working machine is on level ground and is substantially perpendicular to the fore-aft direction A.

In this embodiment, a dozer blade arrangement 22 is pivotally secured to one end of the chassis rails 18a and 18b, which may be raised and lowered by hydraulic cylinders 21 using a known arrangement, and also act as a stabilizer for the machine, by lifting the adjacent wheels off the ground when excavating, however this may not be provided in other embodiments.

A stabilizer leg arrangement 24 is pivotally mounted to an opposite end of the chassis rails 18a and 18b, which also may be raised and lowered by hydraulic cylinders 23 using a known arrangement, but in other embodiments this may be omitted.

Drive

Figure 4:
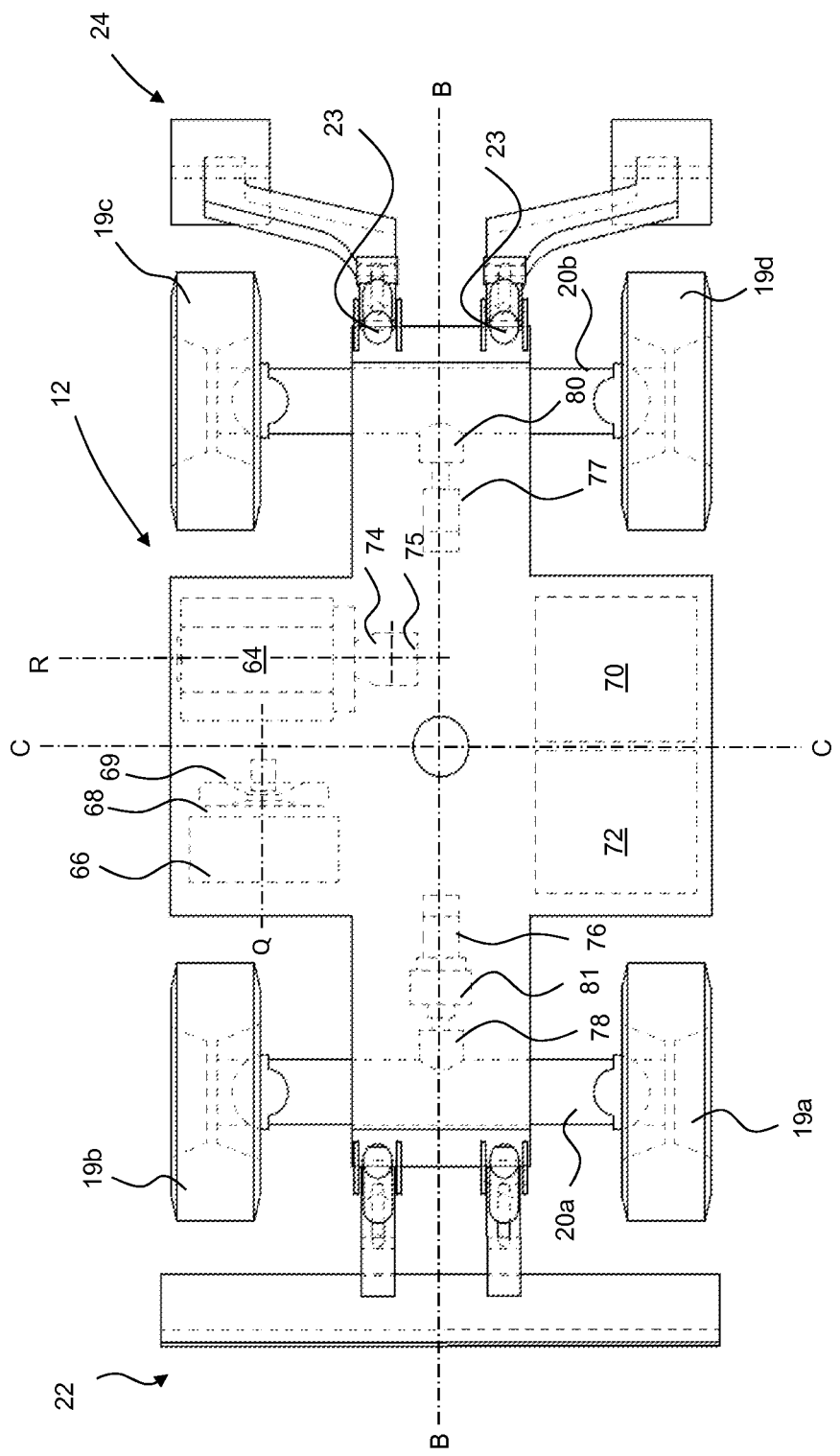
FIG. 4 is a plan view of an undercarriage portion of the machine of FIG. 1.

Referring now to FIG. 4, contrary to known excavators, the drive arrangement, including a prime mover and transmission are housed in the undercarriage 12. In the present embodiment, the prime mover is a diesel IC engine 64. The engine 64 is mounted to one side of an axis B extending centrally through the undercarriage in a fore-aft direction. The engine 64 is mounted transverse to the axis B, i.e. an axis of rotation R of a crankshaft of the engine is transverse to the axis B in the fore-aft direction. The engine 64 is further orientated such that the pistons of the engine extend in the substantially upright direction U.

A heat exchanger 66 and cooling fan 68 are housed in the undercarriage adjacent the engine 64. The cooling fan 68 is orientated such that the axis of rotation Q of the fan extends in a fore-aft direction A, although it may be orientated differently in other embodiments.

A fuel tank 70 providing a fuel supply to the engine 64 is positioned on an opposite side of the axis B to the engine. A hydraulic tank 72 is provided adjacent the fuel tank 70 on an opposite side of the axis B to the engine.

The engine 64, heat exchanger 66, cooling fan 68, fuel tank 70 and hydraulic tank 72 are all housed in a region between the axles 20a and 20b. As can be seen in FIG. 1, the engine 64 is positioned below a level coincident with a lower extent of the superstructure 14. Indeed the majority of the engine 64, and in this embodiment the entire engine 64 is positioned below a level Q coincident with an upper extent of the wheels 19a, 19b, 19c, 19d. In the present embodiment the majority of the heat exchanger 66, cooling fan 68, fuel tank 70 and hydraulic tank 72 are below a level Q coincident with the upper extent of the wheels 19a, 19b, 19c, 19d.

Figure 5:
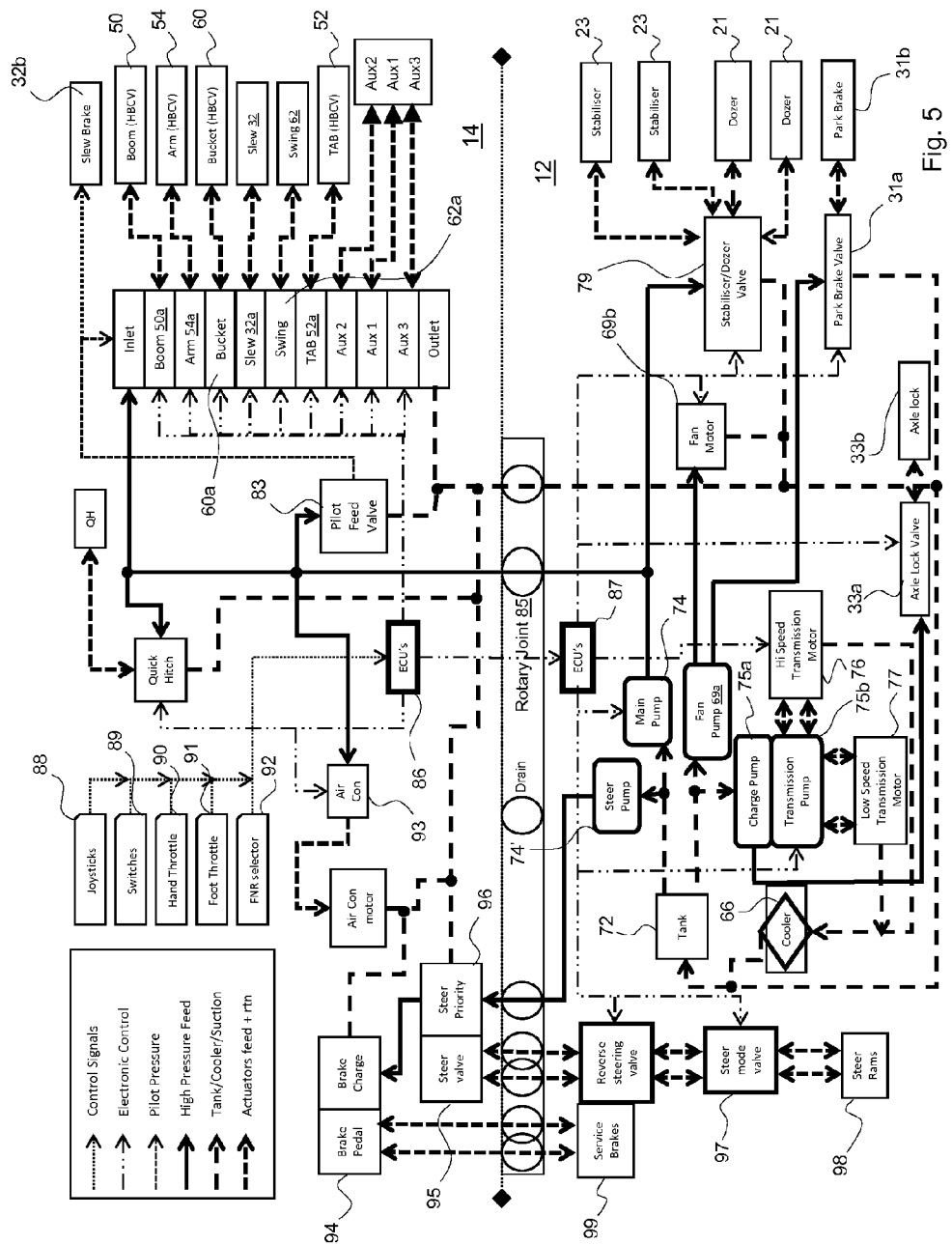
FIG. 5 is a schematic view of a hydraulic and electronic control system of the working machine of FIG. 1.

Referring to FIG. 5, in the present embodiment the transmission is a hydrostatic transmission. The transmission includes a high pressure swash plate type hydraulic transmission pump 75b as well as an associated charge pump 75a. The transmission pump in turn is capable of selectively driving two hydraulic motors 76 and 77. The transmission pump 75b has a typical operating pressure of around 350-450 bar (35-45 MPa).

The engine 64 is configured to drive the charge pump 75a, and the transmission pump 75b. The pumps 75a and 75b are configured to draw hydraulic fluid from the hydraulic fluid tank 72 as required and supply to the hydraulic motors 76 and 77 via a dedicated feed and return hoses (i.e. the flow is essentially closed loop but with hydraulic fluid drawn from and returned from the tank 72 as required). In the present embodiment, the hydraulic motor 76 is positioned towards the dozer blade arrangement 22. The engine 64, hydraulic pump 74 and hydraulic motor 77 are positioned towards the stabilizer arrangement 24.

The first hydraulic motor 76 is a high speed swash plate type motor having a large displacement range, for example of 0 to 255 cm3/revolution, and drives the front axle 20a in a normal direction of travel. The output of the motor faces forwards and drives the first axle 20a via a short drive shaft 78 and differential (not shown). The second hydraulic motor 77 is a relatively low speed swash plate type motor having a smaller displacement range for example of 0 to 125 cm3/revolution. The low speed motor 77 connects to a second drive shaft 80 to drive the second (rear) axle 20b via a second differential (not shown).

In other embodiments a single hydraulic motor may provide drive to both the front and rear axles, typically with a two wheel drive/four wheel drive selector operating a clutch to disengage/engage drive to one axle.

The charge pump 75a and transmission pump 75b are positioned adjacent the engine 64 and are orientated such that an input to the pumps from the engine is axially aligned with an output from the engine to the pump.

Arranging the drive arrangement as described in the undercarriage has been found to result a reduction in the volume of components to be housed in the superstructure, in turn resulting in a line of sight (angle α of FIG. 3) over the right hand rear corner of the machine for an operator having a height of 185 cm (a 95th percentile male) when seated in the operator's seat at the left hand side of the machine in excess of 30° (33° in this embodiment) below the horizontal (compared to around 22° in conventional midi excavators of this size). This results in a significant reduction of the ground area around the machine that is obscured by parts of the superstructure, thereby improving visibility for maneuvering the machine.

A further advantage of positioning the drive arrangement in the undercarriage, compared to conventional excavators where the drive arrangement is generally positioned in the superstructure is that noise, vibration and harshness (NVH) isolation is improved between the engine and the cab to improve comfort and safety for an operator. In addition, access to the engine, fuel tank, fluid tank, etc. for maintenance and refuelling is at ground level.

Superstructure

The superstructure 14 comprises a structural platform 26 mounted on the slew ring 16. As can be seen in the Figures, the slew ring 16 is substantially central to the undercarriage 12 in a fore-aft direction A and a lateral direction L, so as to mount the superstructure 14 central to the undercarriage. The slew ring 16 permits rotation of the superstructure 14 relative to the undercarriage about a generally upright axis Z.

A rotary joint arrangement 85 is provided central to the slew ring 16 and is configured to provide multiple hydraulic fluid lines, a return hydraulic fluid line, and an electrical—Controller Area Network (CAN)—signal line to the superstructure from the undercarriage, whilst permitting a full 360° rotation of the superstructure relative to the undercarriage. The configuration of such a rotary joint arrangement is known in the art.

The platform 26 mounts a cab 30. The cab houses the operator's seat and machine controls (discussed below).

The superstructure 14 is rotated relative to the undercarriage 12 using a first hydraulic motor 32 and brake.

The platform further mounts a kingpost 28 for a working arm arrangement 40. The kingpost 28 arrangement is known in the art, and permits rotation of the working arm about a generally upright axis X and about a generally lateral axis W.

The superstructure further comprises a counterweight 34 for the working arm arrangement positioned at an opposite side of the superstructure to the kingpost 28.

Hydraulic Supply

In this embodiment illustrated in FIG. 5, the engine 64 additionally drives a main, lower pressure hydraulic pump 74 arranged in series with the charge 75*a* and transmission pumps 75*b*. In this embodiment, the main hydraulic pump has an operating pressure of around 250-300 bar (25-30 MPa) and is also of a variable displacement type.

The main pump 74 supplies hydraulic fluid to the hydraulic cylinders 50, 52, 54, 60, 62 for operating the working arm arrangement via associated valves in the superstructure 14 and denoted by the same numeral with the suffix 'a', to a slew brake via a pilot feed valve 83, and to auxiliary hydraulic fluid supplies for use by certain attachments such a grabs etc. (not shown). The main pump 74 additionally supplies hydraulic cylinders 21, 23 of the dozer blade and stabilizer arrangement via a stabilizer/dozer valve 79 in the undercarriage. However, in alternative embodiments a single pump may be used for supplying hydraulic fluid to the motors and the hydraulic cylinders. The main pump 74 is further used to provide hydraulic fluid for air conditioning 93, as illustrated in FIG. 5.

In this embodiment the engine additionally drives a separate pump 74' for the steering system and a fan pump 69*a* to drive a cooling fan 69*b* and a park brake valve 31*a* for a parking brake 31*b*. These pumps are, in this embodiment, gear pumps operable at a lower pressure of around 200 bar (20 MPa) and without ECU control.

Further, the charge pump 75*a* additionally supplies hydraulic fluid to an axle lock valve 33*a* which selectively prevents the articulation of the front axle 20*a*.

Working Arm

The working arm arrangement 40 of the present embodiment is an excavator arm arrangement. The working arm arrangement includes a triple articulated boom 42 pivotally connected to a dipper 44. The triple articulated boom 42 includes a first section 46 pivotally connected to a second section 48. A hydraulic cylinder 50 is provided to raise and lower the first section 46 of the boom 42 relative to the kingpost 28 about the generally lateral axis W. A further hydraulic cylinder 52 is provided to pivot the second section 48 of the boom 42 relative to the first section of the boom about a generally lateral axis T. A yet further hydraulic cylinder 54 is provided to rotate the dipper 44 relative to the boom 42 about a generally lateral axis S. A mount 56 is provided to pivotally mount an attachment to the dipper 44, in the present embodiment the attachment is a bucket 58. A hydraulic cylinder 60 is provided to rotate the attachment relative to the dipper 44. Alternatively boom cylinder arrangements (e.g. twin cylinders) may however be utilized in other embodiments.

Figure 2:
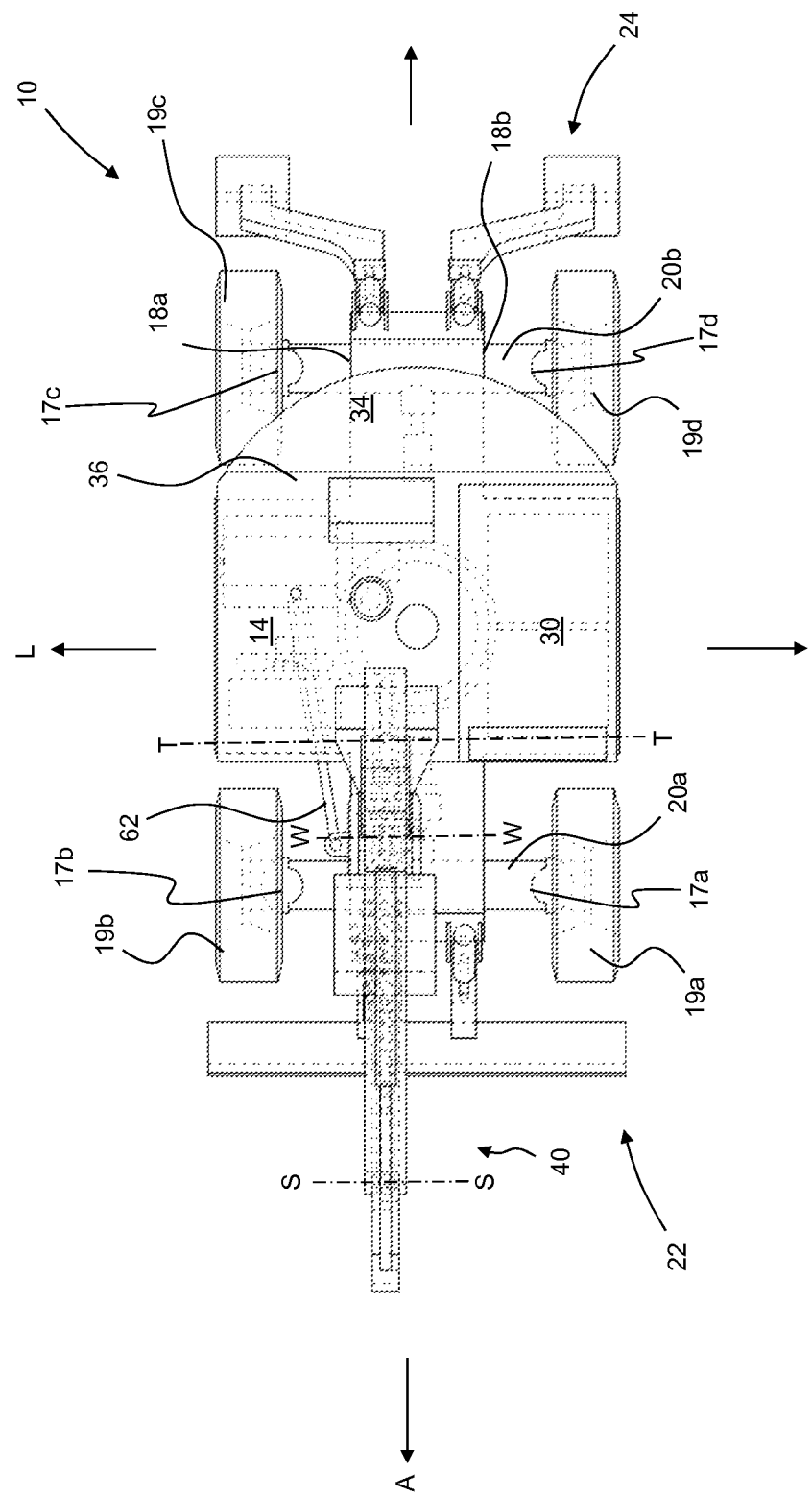
FIG. 2 is a plan view of the machine of FIG. 1.

Shown most clearly in FIG. 2, a yet further hydraulic cylinder 62 is provided to rotate (swing/slew) the working arm arrangement 40 about the generally upright axis X. Using a hydraulic cylinder arrangement to rotate the working arm arrangement simplifies manufacture and operation of the working machine 10.

Machine Controls

A number of machine control inputs are provided in the cab 30. In this embodiment the inputs (with the exception of steering and braking) are electrically transmitted via a CAN bus to one or more superstructure Electronic Control Units (ECUs) 86, incorporating a suitable microprocessor, memory, etc. to interpret the inputs to signal the various valves for controlling movement of the working arm etc. and/or one or more further undercarriage ECUs 87 to ultimately control hydraulic functions in the undercarriage, including a stabilizer/dozer valve 79, a fan motor 69*b*, park brake valve 31*a*, axle lock valve 33*a*, main pump 74, transmission pump 75*b*, steer mode valve 97.

In alternative embodiments an ECU may only be provided in base assembly (e.g. housed in the undercarriage) and signals from the machine input controls may be sent directly to the ECU 87 in the undercarriage instead of via the ECU 86 in the superstructure. The electrical connections for such an arrangement can be routed from the control inputs to the ECU 87 via the slew ring and rotary joint arrangement.

The control inputs include: joysticks 88 to control operation of the working arm 40, switches 89 for various secondary functions, a hand throttle 90 to set engine speed for working operations, a foot throttle 91 to dynamically set engine speed for roading/maneuvering, and a forward/neutral/reverse (FNR) selector 92 to engage drive in a desired direction.

Due to the safety-critical nature of steering and braking, the brake pedal and steering are hydraulically controlled by a brake pedal 94 and steer valve 95 linked to a steering wheel (not shown). Hydraulic fluid feed is from the dedicated steer pump 74' via the rotary joint 85 and a steer priority valve 96, which ensure an appropriate supply of hydraulic fluid is provided to the brake pedal 94/steer valve 95, dependent upon demand.

The steer valve 95 then feeds a steer mode valve 97 in the undercarriage 12, which controls whether the machine is operating in four-wheel steer (off road), two-wheel steer (on road) or crab steer, via another feed through the rotary joint. The steer mode valve then feeds hydraulic fluid to appropriate steering cylinders 98, dependent upon the mode chosen.

The brake pedal 94 supplies fluid to service brakes 99 at the wheel ends also via a feed through the rotary joint. A separate hydraulic fluid feed from a fan pump 69a supplies a parking brake valve 31a as well as the fan motor 69b and axle lock valve 33a under the control of the superstructure ECU(s) 86 and undercarriage ECU(s) 87.

In other embodiments, braking and steering may be affected via electronic control, provided a suitable level of fault tolerance is built into the system.

High Speed Roading Operation

When operating on road ("roading") or e.g. maneuvering on a level/hard surface, speed of movement of the machine 10 is preferred ahead of traction or torque. Thus, in a first two-wheel drive operating mode, the vehicle operator selects 2WD on a 2WD/4WD selector (not shown), signaling the appropriate superstructure ECU 86, which in turn signals the transmission pump 75b via the undercarriage ECU 87 to permit the flow of hydraulic fluid to the high speed motor 76.

Thereafter, the operator selects forward or reverse from the FNR selector 92, the signal for which is fed through to the transmission pump 75b in a similar manner to direct hydraulic fluid therethrough in the correct flow direction to turn the high speed motor 76, and therefore the wheels 19a and 19b, in the desired direction.

The operator then sets the engine speed using the foot throttle 91 which in turn drives the transmission pump 75b at the desired speed. The undercarriage ECU 87 controls the swash angle of the pump 75b and high speed motor 76, resulting in rotation of the high speed motor 76 and driven rotation of the wheels 19a, 19b on the first axle 20a.

Typically, this enables travel at a maximum speed of around 40 km/h.

Low Speed Operation

For low speed, higher torque, higher traction maneuvering, typically in an off-road location such as a construction site, the operator selects a second four wheel drive operating mode from the 2WD/4WD selector. This in turn signals superstructure ECU 86, which in turn signals the transmission pump 75b via the undercarriage ECU 87 to permit the flow of hydraulic fluid to both the high speed motor 76 and low speed motor 77.

Thereafter, the operator selects forward or reverse from the FNR selector 92, the signal for which is fed through to the transmission pump 75b in a similar manner to determine the direction of flow of hydraulic fluid into the high speed motor 76 and low speed motor 77.

The operator then sets the engine speed using the foot throttle 91 which in turn drives the transmission pump 75b at the desired speed. The undercarriage ECU 87 preferably controls the swash angle of the pump 75b and high speed motor 76, ultimately resulting in rotation of the high speed motor 76, low speed motor 77 and drive to the wheels 19a, 19b, 19c, 19d on both the first and second axles 20a, 20b at compatible speeds.

Typically, this operating mode provides a lower maximum speed for off-road operation e.g. of 10 km/h or less.

Telehandler

Figure 6:
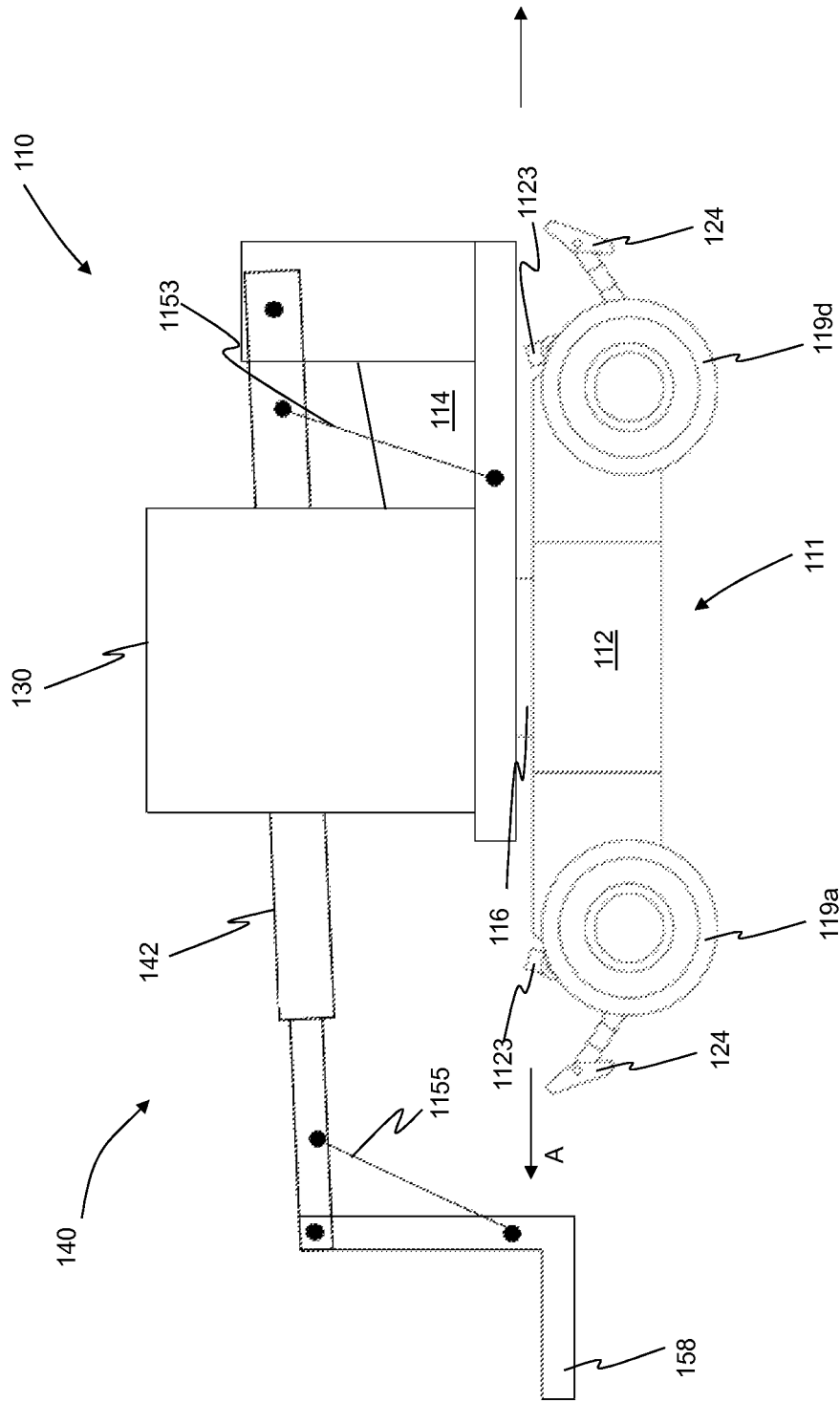
FIG. 6 is a side view of a working machine according to an embodiment of the present invention.
Figure 7:
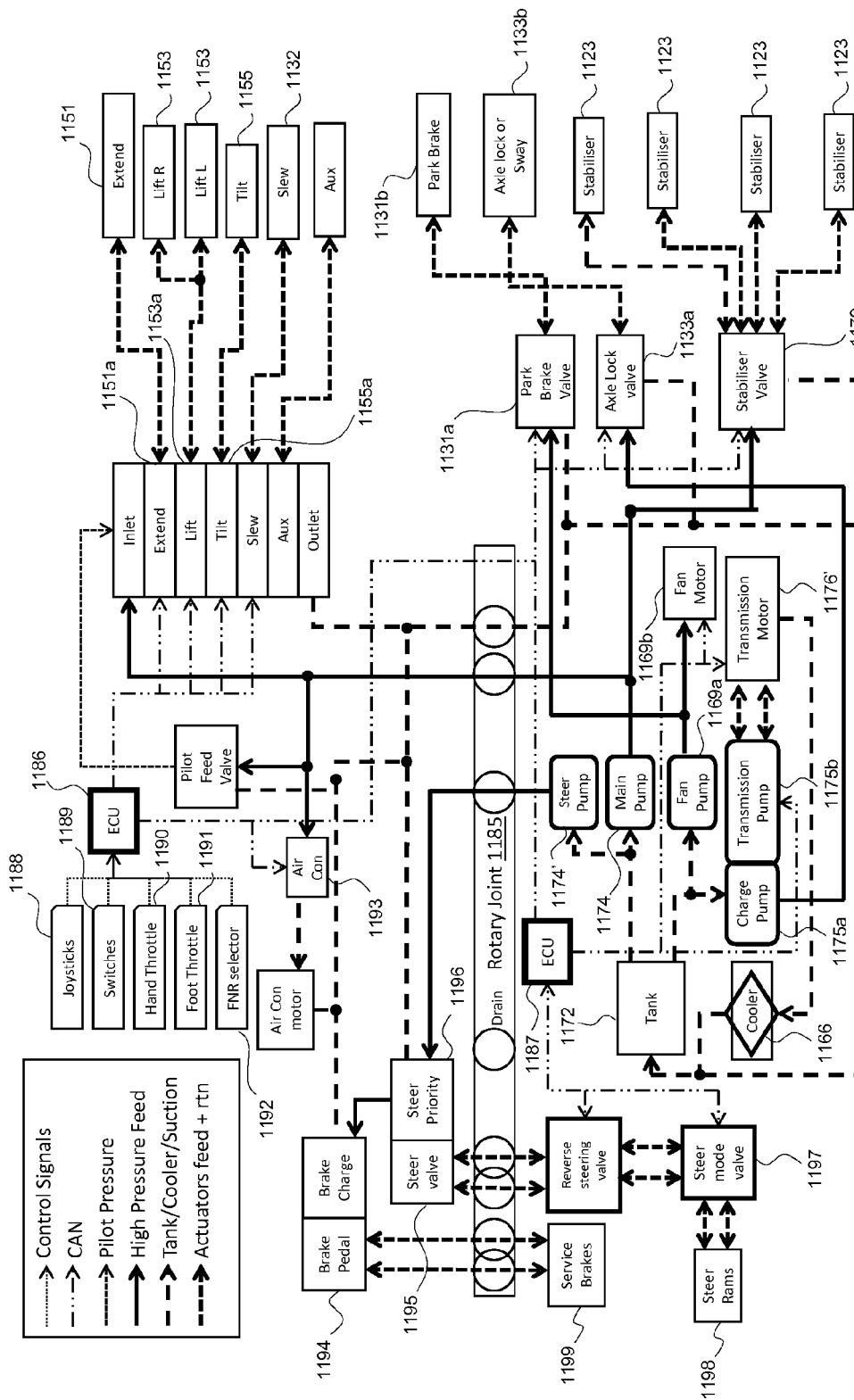
FIG. 7 is a schematic view of a hydraulic and electronic control system of the working machine of FIG. 6.

Referring now to FIGS. 6 and 7, an alternative working machine 110 is shown. In this embodiment the working machine may be considered a telehandler (also known as a telescopic handler, specifically a rotating telescopic handler). The working machine 110 has a similar base assembly 111 to that of the working machine 10 of FIGS. 1 to 4 (although in this embodiment it has a longer wheelbase to aid stability), but the superstructure 114, working arm arrangement 140 and cab 130 are different.

In the present embodiment, the superstructure 114 is mounted to the undercarriage 112 via a slew ring 116 and rotary joint (not shown) as described previously, such that the superstructure 114 and working arm arrangement 140 can rotate relative to the undercarriage 112.

The superstructure 114 mounts a cab 130 offset to one side of the undercarriage 112 in the lateral direction L. The cab 130 is positioned towards a fore of the superstructure 114 in the fore-aft direction A when the working machine is in a roading position. The superstructure 114 mounts the working arm arrangement 140 centrally or near centrally in the lateral direction L and towards the aft of the superstructure 114 in a fore-aft direction when the working machine 110 is in a roading position.

In the present embodiment the working arm arrangement 140 includes a telescopic boom 142. An attachment is removably attachable to a free end of the boom. In the present embodiment the attachment is forks 158. When the telescopic boom 142 is in its lowest position, e.g. when commencing loading of an object from the ground, the boom is angled at approximately 4° to the ground (i.e. to the horizontal if the working machine is on flat level ground). The counterweight provided with the superstructure is larger than that for the working machine 10 so that the working machine 110 has an increased loading capacity to working machine 10.

The layout of the hydraulic system is substantially the same as described in FIG. 5 for the working machine 10 of FIGS. 1 to 4. Like features with respect to FIG. 5 are labeled with the prefix 11, and only differences are discussed.

In this embodiment, the transmission comprises a single transmission motor 1176' which is able to be selectively driven by the transmission pump 1175b. Therefore, the charge pump 1175a and transmission pump 1175b are configured to draw fluid from the hydraulic tank 1172 as required to supply this to the transmission motor 1176'. In other embodiments, two hydraulic motors may be provided in a similar arrangement to FIG. 5.

In this embodiment, the main pump 1174 supplies hydraulic fluid from the hydraulic tank 1172 to the hydraulic cylinders 1151, 1153, 1155 for operating the working arm arrangement 140 via associated valves in the superstructure 114 and denoted by the same numeral with the suffix 'a', and to a single auxiliary hydraulic fluid supply for use by certain attachments (not shown). The main pump 1174 is able to selectively supply hydraulic fluid to the hydraulic cylinder 1151 in order to telescopically extend or retract the boom 142 and is able to control the lift of the boom 142 by selectively supplying hydraulic fluid to the right and left lift cylinders 1153. In addition to this, the tilt angle of the forks 158 is able to be adjusted via the tilt hydraulic cylinder 1155.

In the present embodiment the superstructure 114 is rotatable relative to the undercarriage by the main pump 174 supplying hydraulic fluid to the slewing motor 132, but in alternative embodiments the superstructure 114 may be fixed relative to the undercarriage 112 or provided with a slew cylinder providing a more restricted range of slewing motion instead of the full 360° provided by the motor 132.

The base assembly 111 differs from the previously described base assembly 11 in that it includes a stabilizer arrangement 124 at both a fore and aft of the undercarriage 112. Stabilizer legs of the stabilizer arrangement 124 can be lowered before a loading operation to lift the wheels 19a, 19b, 19c and 19d off the ground.

The hydraulic and electronic control system of working machine 110 is configured differently to that of working machine 10. One reason for the different configuration is the alternative working arm arrangement 140. In the present embodiment, the main control valve of the superstructure 114 feeds different cylinders to that of the working machine 10, i.e. the main control valve feeds a cylinders for lifting/lowering the telescopic boom, a cylinder to extend the boom, and a cylinder to tip/crowd the fork attachment 158.

As will be appreciated by the person skilled in the art, technical and safety requirements of a telehandler differ from those of an excavator. In the present embodiment, similarly to the working machine 10, an ECU 1186 is provided in the superstructure 114 for controlling movement of the working arm etc. The ECU 1186 transmits signals to the ECU 1187 in the undercarriage 112 to control hydraulic functions in the undercarriage, including a stabilizer valve 1179, a fan motor 1169b, park brake valve 1131a, axle lock valve 1133a, main pump 1174, transmission pump 1175b, and steer mode valve 1197. This includes mapping the inputs from the operator cab 130 to correspond to the correct functionality of the superstructure 114, e.g. an input is mapped to a particular valve opening of the main control valve so as to control for example one of the operations of lifting/lowering the boom 142 via lift valve 1153a and lift cylinders 1153, extending the boom 142 via extend valve 1151a and boom extend cylinder 1151, or tipping/crowding the fork attachment 158 via tilt valve 1155a and tilt cylinder 1155. Further, to meet with different safety requirements imposed on a telehandler, a different safety protocol may be required.

In an alternative embodiment, a single ECU may be provided in the undercarriage. In such embodiments, at the point of manufacture the ECU 1187 may be programmed e.g. by "flashing" the ECU with different features so as to operate correctly as a telehandler instead of, for example, an excavator, in a similar manner to that described when an ECU is provided in the superstructure 114.

Crane

Figure 8:
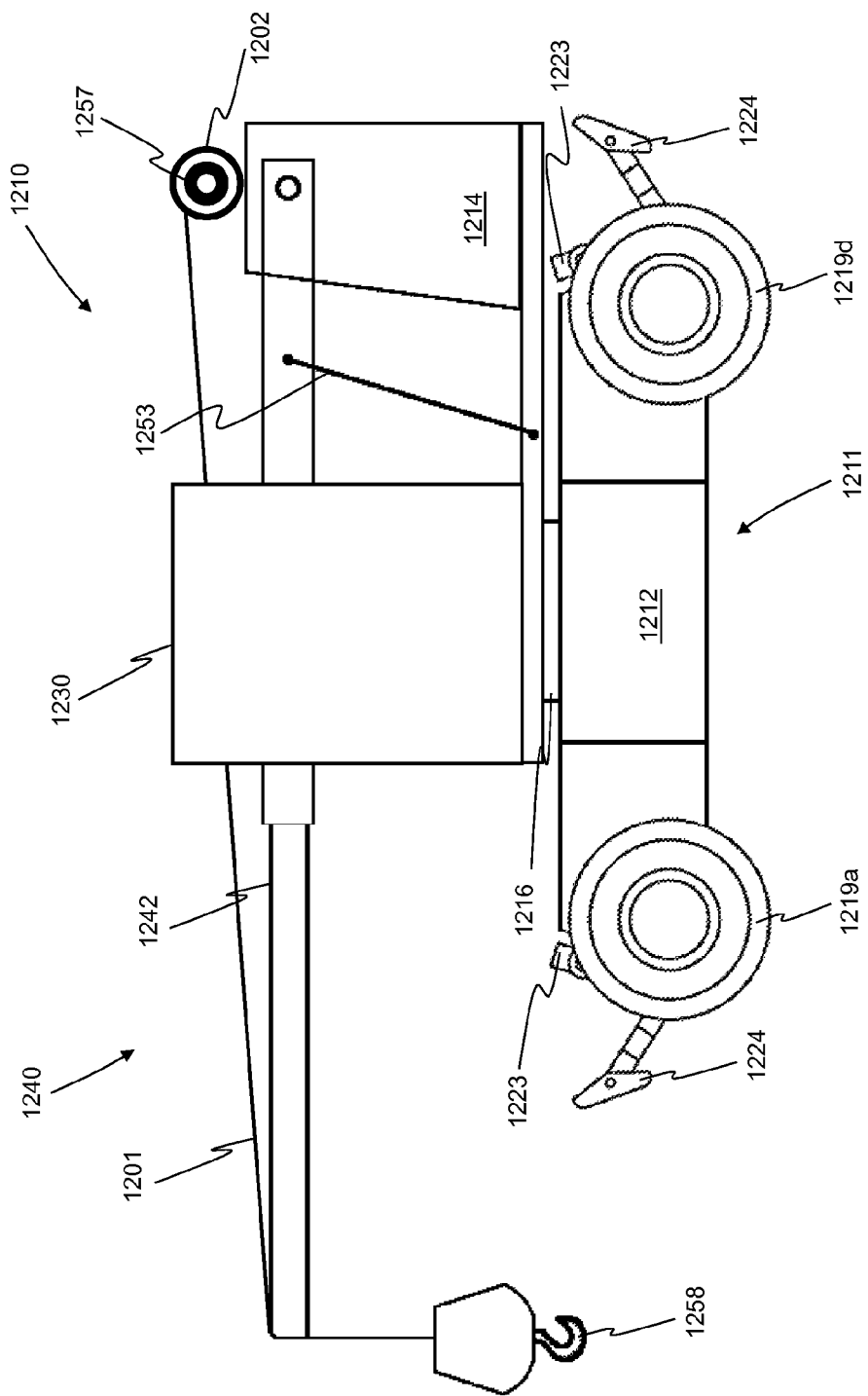
FIG. 8 is a side view of a working machine according to an embodiment of the present invention.
Figure 9:
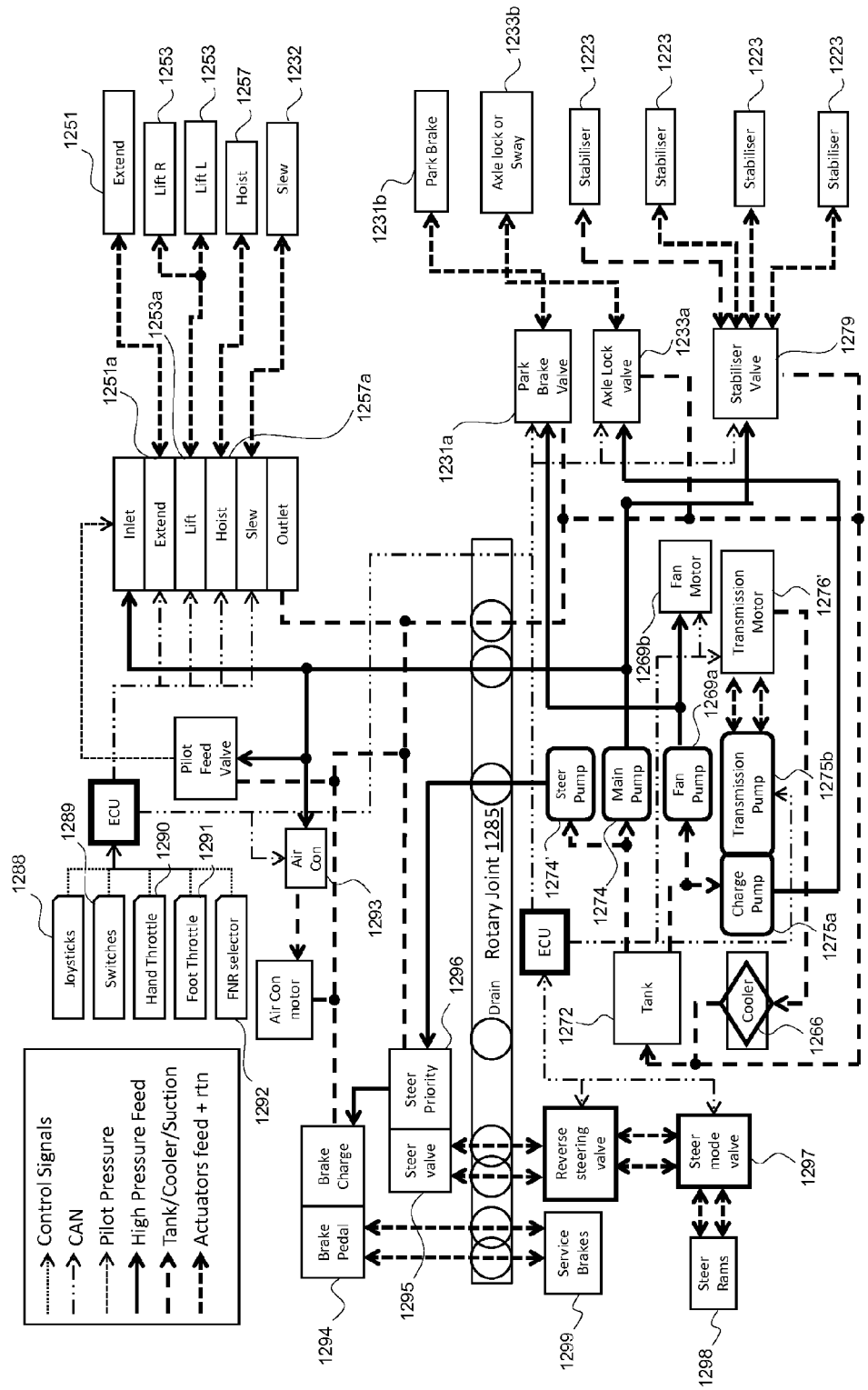
FIG. 9 is a schematic view of a hydraulic and electronic control system of the working machine of FIG. 8.

Referring now to FIGS. 8 and 9, an alternative working machine 1210 is shown. In this embodiment, the working machine may be considered to be a crane. The working machine 1210 has a similar cab 1230 and base assembly 1211, to the working machine 110 of FIG. 6 but the working arm arrangement 1240 is different.

In this embodiment, the hydraulic control system is substantially the same as described in FIG. 7 in relation to the working machine 110 of FIG. 6 although the control system is not provided with a hydraulic cylinder to provide a tilt function of the working attachment.

When the connected superstructure 1214 has a crane working arm 1240, the boom 1242 and superstructure may be similar to that of the telehandler arrangement of FIG. 6. However, in this embodiment the boom 1242 may be positioned horizontally in its lowest position instead of being angled towards the ground as there is not a requirement for attachments pivotably mounted at the end thereof to be able to contact the ground.

Further, a motor 1257 may be provided in or proximate the rear of the boom 1242 to drive the hoist, this arrangement improves lift capacity and forward stability of the crane 1240. In the present embodiment, the hoist includes a wire rope 1201 and a winch 1202. In this embodiment, the main pump 1274 supplies hydraulic fluid from the hydraulic tank 1272 to the hydraulic motor 1257 in order wind the winch 1202. The winch 1202 is provided at the base of the boom 1242. A hook 1258 is provided at the free of the wire rope 1201 and hangs from a fore end of the boom 1242 where it can be connected to articles to be lifted and be raised and lowered by winding in and out of the winch 1202.

In the illustrated embodiment, the base assembly has four stabilizer legs 1224 connected thereto and lowered by stabilizer hydraulic cylinders 1223. During a lifting operation the stabilizer legs 1224 are fully extended to lift the wheels 1219a, 1219b, 1219c, 1219d of the base assembly off the ground. The ECU may be configured to include safety features to prevent lifting operations until the working machine 1210 is secure to do so. For example, the ECU may be configured to check that for example the stabilizer legs 1224 are fully lowered before operation of the crane 1240 is permitted and control rotation, lifting, etc. in accordance with crane safety standards.

MEWP

In a further alternative embodiment, no cab may be mounted on the superstructure and the working arm may be a scissor lift or a telescopic boom having a platform mounted at its free end so as to form a mobile elevated work platform (MEWP). When the working arm is a telescopic boom the superstructure may slew, but when the working arm is a scissor lift the superstructure may be fixed relative to the undercarriage. Again, similarly as previously described, the ECU in the undercarriage will be programmed (e.g. by flashing the ECU or by the ECU receiving signals from an ECU in the superstructure) to extend/retract, lift/lower, or rotate the boom or to extend/retract the scissor arms as applicable and also to perform the appropriate operational protocols to meet safety requirements for an MEWP.

Dump Truck

In a yet further embodiment, the working machine may be a dump truck. In such an embodiment the superstructure is fixedly mounted to the undercarriage such that there is no rotation of the superstructure relative to the undercarriage. The working arm is the tipping mechanism/dump body that is tipped using one or more hydraulic cylinders, and in some embodiments one or more hydraulic cylinders coupled to a lever arrangement.

Secondary Slew

In a still further embodiment, the working machine may be an excavator with a rotary connection between the cab and the superstructure, such that the cab can rotate relative to the superstructure in addition to or alternatively to the superstructure rotating relative to the undercarriage.

Production Process

Advantageously, the commonality of the base assembly 11, 111, 1211 between the working machines 10, 110, 1210 can reduce production time and costs, e.g. the commonality reduces the variation in stock components required for the manufacture of the two or more different working machines. It may also reduce the capital costs of setting up productions lines for multiple working machine types by enabling a single production line to produce multiple machines types.

In certain embodiments, the base assembly 11, 111, 1211 may be provided in the form of a central main chassis with a subsidiary chassis provided as a separate subassemblies mounted at one or each of the front and rear ends of the main chassis (schematically illustrated in the undercarriages of FIGS. 6 and 8 by the vertical lines dividing the chassis). In these embodiment, a single ECU, along with the engine, transmission pump and main pump, are provided in the main chassis. Advantageously, the commonality of the main chassis between working machines can further facilitate the use of a single production line to produce multiple machine variants or types in a modular and therefore cost-effective fashion. The variant subsidiary chassis may be selected depending on the functionality required i.e. dozer arm, stabilizer leg arrangement, two wheel steer, four wheel steer etc., or wheelbase length/overall length required.

The base assembly 11 of excavator 10, base assembly 111 of telehandler 110 and base assembly 1211 of crane 1210 are substantially identical, save for easily interchangeable components such as stabilizers and dozers, or save for different subsidiary chassis to provide a different wheelbase and/or overall length. This means that the base assembly excluding the stabilizer and/or dozer blade arrangement or main chassis can be continuously manufactured (maintenance and demand permitted) with no or minimal tooling change over or assembly change over required to e.g. change from manufacturing an excavator to a telehandler to a crane.

Figure 10:
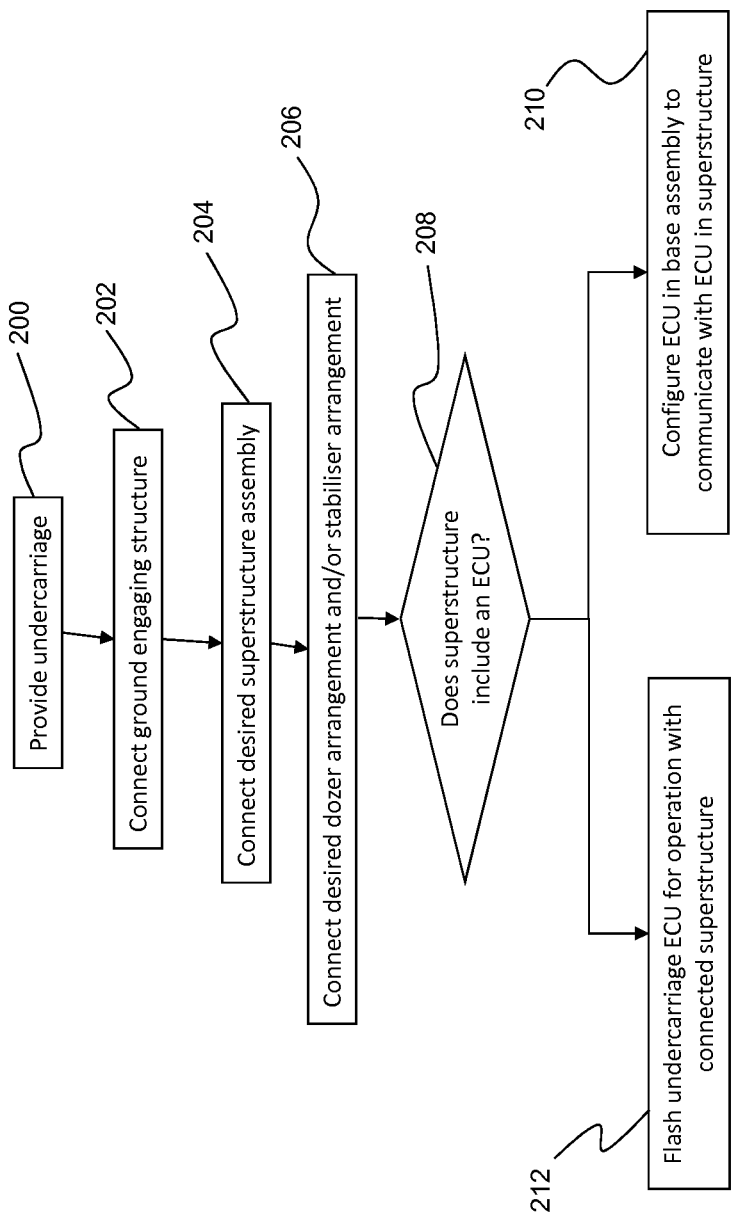
FIG. 10 is a flow diagram of a method of manufacturing two different working machines according to an embodiment of the present invention.

Once the undercarriage is manufactured and assembled the ground engaging structure can be connected to the undercarriage (or the ground engaging structure may already be assembled to the subsidiary chassis). Referring to FIG. 10, the assembled undercarriage is provided to the assembly line at 200. Then at 202, the ground engaging structure is connected to the undercarriage.

Figure 3:
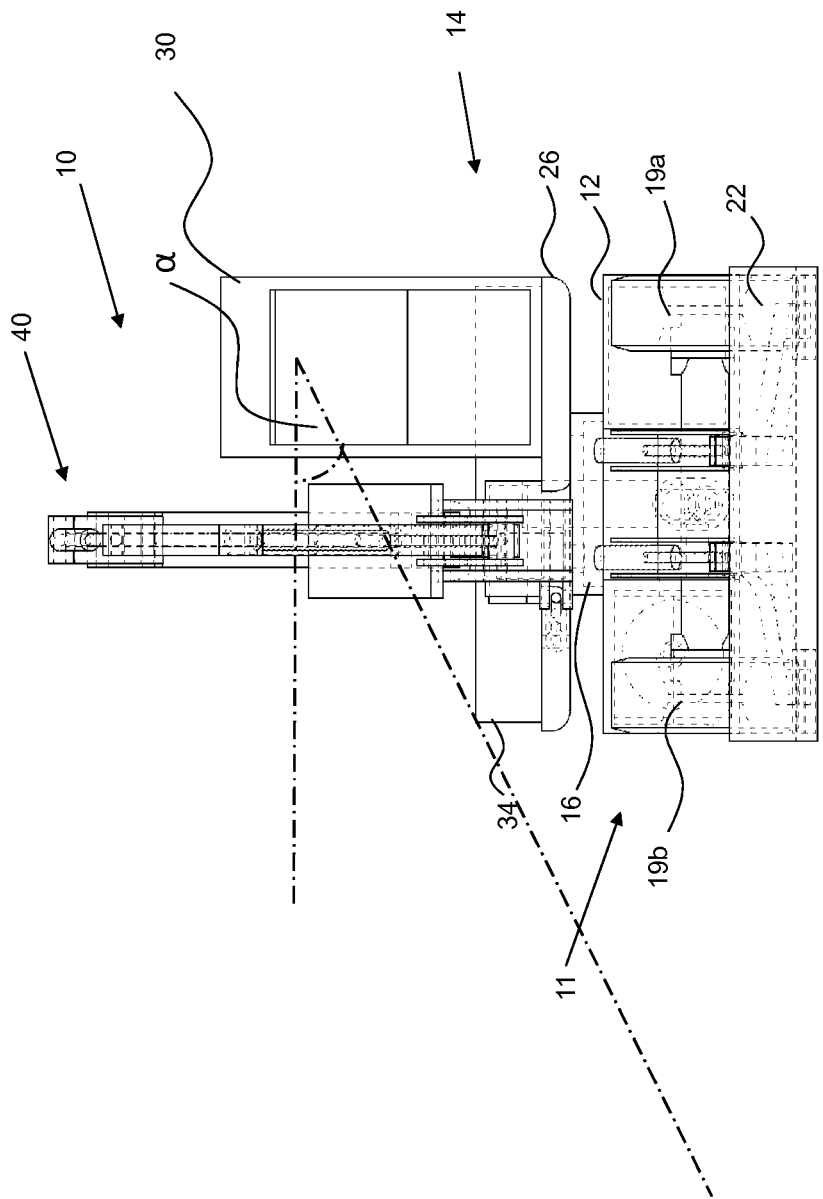
FIG. 3 is a front view of the machine of FIG. 1.

At 204, depending on the type of working machine being manufactured a superstructure that mounts a cab and working arm similar to that shown in either FIGS. 1 to 3 is connected to the connector (the slew ring 16 in the embodiments of FIGS. 1 to 6 and 8) of the undercarriage. The superstructure can then be connected to the undercarriage either with the cab and working arm arrangement attached, or features such as the working arm and cab may be added after connection of the superstructure to the undercarriage.

Then at 206, depending on the type of working machine being assembled either a stabilizer arrangement and/or a dozer blade arrangement is connected to the undercarriage. A complimentary interlocking arrangement may be provided on the undercarriage and the stabilizer and/or dozer blade arrangement to simplify connection to the undercarriage and provide inter-changeability either at the point of manufacture or optionally in the field.

In alternative embodiments, the undercarriage may be provided in the form of a central main chassis with a subsidiary chassis, as described above, mounted at each of the fore and aft ends of said main chassis. In this embodiment, a range of subsidiary chassis are provided each with differing attachments such as dozer blades, stabilizer arms etc. and so at 206 the required subsidiary chassis are mounted to the main chassis.

As described above, in some embodiments the superstructure will have an ECU associated with it and in other embodiments there will only be a single ECU provided and positioned in the base of the working machine. Decision box 208 of FIG. 10 indicates this step.

If there is an ECU associated with the superstructure, the ECU in the base assembly is configured to communicate with the ECU in the superstructure, such that the base assembly can be operated in a manner suitable for the superstructure connected thereto. This is indicated by method step 210.

If there is no ECU associated with the superstructure the ECU in the base assembly is configured to control the base assembly, and in many embodiments the superstructure, cab and/or working arm connected thereto. This is indicated by method step 212.

As will be appreciated by a person skilled in the art, the steps of the described method may be performed in an alternative order. For example, the stabilizer/dozer arrangement may be attached after the superstructure is connected to the undercarriage and/or the ground engaging structure may be connected to the undercarriage after the remainder of the working machine is assembled, or for example the axles may be assembled with the undercarriage and the wheels added at a later stage in the production.

Variants

Although the invention has been described above with reference to one or more preferred embodiments, it will be appreciated that various changes or modifications may be made without departing from the scope of the invention as defined in the appended claims.

Although the present invention has been described in the context of a particular machine layout, for which it is considered particularly advantageous, certain advantages of the present invention may be achieved if it is used in more conventional machines such as conventional wheeled slew excavators having engines and hydraulic pumps in the superstructure thereof, or telehandlers, rough terrain cranes etc. having hydrostatic or other types of transmissions. In addition, in other embodiments, the prime mover may be located within either the main or subsidiary chassis, instead of within a side pod.

In an alternative embodiment, the main chassis may have mounts for an axle, a hydraulic cylinder and one of a dozer blade arrangement, a stabilizer leg arrangement or a tractor-type hydraulic three-point linkage. In this embodiment, the main chassis may be configured to mount only one subsidiary assembly to the main chassis.

For example, the superstructure could have a pilot control of the hydraulic functions routed through the slew ring or direct to the main control valve instead of using the CAN bus.

The pressure and/or flow of hydraulic fluid may be directed to the high and low speed motors 77, 76 in the low speed operating mode in order to shift the balance of power to either motor. For example, in response to the machine sensing loss of traction on one axle through the use of suitable sensors, hydraulic flow may be diverted to the other axle.

The low speed and/or high speed motors may be connected directly to the or each axle they drive, or a pair of high speed motors may drive individual wheels on one axle and low speed motors individual wheels on the second axle.

In other embodiments, an alternative transmission arrangement may be used, such as a conventional gearbox, powershift gearbox and/or torque converter gearbox. An alternative prime mover may also be used instead of or in conjunction with an IC engine, for example an electric motor.

Although in this embodiment, the main pump is illustrated as providing hydraulic fluid for the pilot feed valve, and therefore for the various hydraulic cylinders and motors, in other embodiments the supply to the pilot feed valve may be provided by the charge and transmission pumps.

In other embodiments the main pump and the charge and transmission pumps may be driven in parallel rather than in series via a bevel gearbox, for example and a clutch mechanism may be provided to disengage drive to the pumps if not required for a particular operation.

The present invention may also be suitable for use with tracked vehicles and those with bodies formed of two mutually articulated portions for steering, each with a fixed axle.

In the presently described embodiment the engine is positioned perpendicular to the axis B so as to reduce the packaging size of the engine and transmission of the present embodiment, but advantages of the invention can be achieved in alternative embodiments where the engine may be positioned at an alternative transverse position, for example between 30 and 70° to axis B measured in a clockwise direction.

In the presently described embodiment the engine is positioned such that a longitudinal axis of the pistons is orientated substantially upright, but in alternative embodiments the pistons may be alternatively orientated, for example the pistons may be substantially horizontal. In further alternative embodiments, the prime mover may not be a diesel engine, for example the engine may be a petrol engine.

The arrangement of the fuel tank, hydraulic fluid tank, heat exchanger, fan and engine of the present invention is advantageous because of its compact nature, but advantages of the invention can be achieved in alternative embodiments where these components may be positioned in alternative locations, for example the fuel tank and hydraulic fluid tank may not be positioned between the axles.

The described excavator includes a dipper and a triple articulated boom, but in alternative embodiments the boom may only be articulated at the connection to the superstructure and the dipper. In further alternative embodiments a section of the boom or the dipper may be telescopic.

The working machine may be operated using manual hydraulic or electro-hydraulic controls.

In the present embodiment, the wheels on both axles are steerable (i.e. the working machine is configured for four wheel steer), but in alternative embodiments only the wheels on one of the axles may be steerable (i.e. the working machine is configured for two wheel steer).

The invention claimed is:

1. A base assembly for a working machine, the base assembly comprising:
    a ground engaging structure comprising a front axle and a rear axle, the front axle and the rear axle each having a pair of wheels mounted thereto;
    an undercarriage connected to the ground engaging structure;
    a connector for connecting the undercarriage to a superstructure that mounts a working arm;
    a drive arrangement for moving the ground engaging structure to propel, in use, the base assembly and a connected superstructure, wherein the drive arrangement includes a prime mover and a transmission and the drive arrangement is housed within the undercarriage; and
    an electronic control unit (ECU) for controlling the drive arrangement and/or the ground engaging structure,
    wherein the prime mover is entirely positioned below a level coincident with a level of connection of the connector to the superstructure, and
    wherein the prime mover is entirely positioned below a level coincident with an upper extent of the wheels.

2. The base assembly according to claim 1, wherein the ECU is housed within the undercarriage.

3. The base assembly according to claim 1, wherein the ECU is configured to, in use, control superstructure functions of a superstructure connected to the base assembly.

4. The base assembly according to claim 3, wherein the ECU controls hydraulic functionality of a superstructure connected to the base assembly.

5. The base assembly according to claim 4, wherein the ECU controls operation of the working arm, e.g. lifting/lowering, extension/retraction, and/or articulation of the working arm.

6. The base assembly according to claim 3, wherein the ECU controls the electronic functionality of the superstructure.

7. The base assembly according to claim 3, wherein the ECU is configured to receive signals from inputs of the superstructure to control the superstructure functionality.

8. The base assembly according to claim 1, wherein the ECU is configured to receive signals from inputs of the superstructure to control the drive arrangement and/or ground engaging structure.

9. The base assembly according to claim 1, wherein the ECU is configured to receive signals from an auxiliary ECU associated with a superstructure that is connected, in use, to the base assembly.

10. The base assembly according to claim 9, wherein the signals received by the ECU are CAN bus messages.

11. The base assembly according to claim 1, wherein the ECU transmits CAN bus messages to control the drive arrangement and/or the ground engaging structure.

12. The base assembly according to claim 1, wherein the drive arrangement is a hydrostatic drive arrangement, further comprising a chassis control valve for controlling fluid flow to a hydrostatic motor of the drive arrangement, and wherein the ECU is configured to control the chassis control valve.

13. The base assembly according to claim 12, wherein the working arm is hydraulically operated and the chassis control valve is further configured to control fluid flow to the working arm.

14. A working machine comprising:
    a base assembly, the base assembly comprising:
        a ground engaging structure comprising a front axle, a rear axle, first wheels mounted to the front axle at opposing first and second ends of the front axle, and second wheels mounted to the rear axle at opposing first and second ends of the rear axle;
        an undercarriage connected to the ground engaging structure;
        a connector for connecting the undercarriage to a superstructure that mounts a working arm;
        a drive arrangement for moving the ground engaging structure to propel, in use, the base assembly and a connected superstructure, wherein the drive arrangement includes a prime mover and a transmission and the drive arrangement is housed within the undercarriage; and
        an electronic control unit (ECU) for controlling the drive arrangement and/or the ground engaging structure;
    and including:
    a superstructure connected to the base assembly; and
    a working arm mounted to the superstructure,
    wherein the prime mover is entirely positioned below a level coincident with a level of connection of the connector to the superstructure, and
    wherein the entirety of the prime mover is interposed between the first wheel mounted to the first end of the front axle and the second wheel mounted to the first end of the rear axle.

15. The working machine according to claim 14, comprising another ECU associated with the superstructure and configured to transmit control signals to the ECU of the base assembly.

16. The working machine according to claim 15, wherein the working arm is hydraulically actuated and a main control valve is provided in the superstructure for controlling fluid flow to the working arm.

17. A method of manufacturing two different machines, the method comprising:

provabilityviding substantially identical base assemblies, each of the base assemblies comprising: a ground engaging structure comprising a front axle and a rear axle, the front axle and the rear axle each having a pair of wheels mounted thereto; an undercarriage connected to the ground engaging structure; a connector for connecting the undercarriage to a superstructure that mounts a working arm; a drive arrangement for moving the ground engaging structure to propel, in use, the base assembly and a connected superstructure, wherein the drive arrangement includes a prime mover and a transmission and the drive arrangement is housed within the undercarriage; and an electronic control unit (ECU) for controlling the drive arrangement and/or the ground engaging structure; and connecting one superstructure with one type of working arm to a first one of the base assemblies and connecting a different superstructure with a different type of working arm to a second one of the base assemblies, wherein the prime mover of the first one of the base assemblies is entirely positioned below a level coincident with a level of the connection of the connector of the first one of the base assemblies to the one superstructure, wherein the entirety of the prime mover of the first one of the base assemblies is positioned below a level coincident with an upper extent of the wheels of the first one of the base assemblies, wherein the prime mover of the second one of the base assemblies is entirely positioned below a level coincident with a level of the connection of the connector of the second one of the base assemblies to the different superstructure, and wherein the entirety of the prime mover of the second one of the base assemblies is positioned below a level coincident with an upper extent of the wheels of the second one of the base assemblies.

18. The method according to claim 17, comprising programming the ECU to operate the base assembly and/or superstructure and/or working arm in a manner suitable for the type of superstructure connected to the base assembly.

19. The method according to claim 17, comprising providing an auxiliary ECU in the superstructure configured to communicate with the ECU of the base assembly to control operation of the base assembly in a manner suitable for the type of superstructure connected to the base assembly.

* * * * *